(12) United States Patent
McDonnell et al.

(10) Patent No.: US 12,108,768 B2
(45) Date of Patent: Oct. 8, 2024

(54) MEAT PROCESSING METHOD AND APPARATUS

(71) Applicant: DEVRONE UNLIMITED COMPANY, Ardee (IE)

(72) Inventors: Declan Arthur McDonnell, Blackrock (IE); Sven Gerhard Dudeck, Kirchheim (DE); Eik Arnold, Munich (DE); Matthias Goldammer, Munich (DE)

(73) Assignee: DEVRONE UNLIMITED COMPANY, Ardee (IE)

( * ) Notice: Subject to any disclaimer, the term of this patent is extended or adjusted under 35 U.S.C. 154(b) by 123 days.

(21) Appl. No.: 17/786,560

(22) PCT Filed: Dec. 9, 2020

(86) PCT No.: PCT/EP2020/085389
§ 371 (c)(1),
(2) Date: Jun. 17, 2022

(87) PCT Pub. No.: WO2021/122247
PCT Pub. Date: Jun. 24, 2021

(65) Prior Publication Data
US 2023/0022593 A1 Jan. 26, 2023

(30) Foreign Application Priority Data

Dec. 20, 2019 (EP) ..................................... 19218654
Dec. 20, 2019 (EP) ..................................... 19218659

(51) Int. Cl.
*A22C 17/00* (2006.01)
*B25J 11/00* (2006.01)

(52) U.S. Cl.
CPC ........ *A22C 17/0086* (2013.01); *A22C 17/004* (2013.01); *A22C 17/0093* (2013.01); *B25J 11/0045* (2013.01)

(58) Field of Classification Search
CPC .............. A22C 17/0086; A22C 17/004; A22C 17/0093; B25J 11/0045
(Continued)

(56) References Cited

U.S. PATENT DOCUMENTS 5,937,080 A * 8/1999 Vogeley, Jr. ............. B26D 7/30
382/110
6,600,805 B2 7/2003 Hansen
(Continued)

FOREIGN PATENT DOCUMENTS

CN 105651776 A 6/2016
EP 2047248 B1 2/2011
(Continued)

OTHER PUBLICATIONS

International Search Report issued in PCT/EP2020/085389; mailed Feb. 10, 2021.

*Primary Examiner* — Richard T Price, Jr.
(74) *Attorney, Agent, or Firm* — Studebaker & Brackett PC

(57) ABSTRACT

A meat processing apparatus has an automated analysis stage for analysing meat parts with penetrating radiation. Data is generated for sue in both feedforward and feedback information, and may be used for robotic control of trimming and boning operations. There is a radiation-shielded chamber within which there is a tomography scanner with a scanner controller, arranged to perform analysis of meat parts. A port is used for entry and exit of meat parts placed in carriers into and out of the chamber for analysis by the scanner, and a handling system performs automated movement of the carriers between the port and the scanner. The (Continued)

port has an interlock chamber, having an inner door and an outer door and a controller to ensure that while the scanner is operating only one door can open. The meat parts are inspected automatically by an inspection station and a controller of the inspection station feeds forward data which is used by the scanner controller to control scanner operation according to meat part physical attributes.

21 Claims, 11 Drawing Sheets

(58) Field of Classification Search
USPC .......................................................... 452/134
See application file for complete search history.

(56) References Cited

U.S. PATENT DOCUMENTS

| | | | |
|---|---|---|---|
| 7,850,512 B2 | 12/2010 | Eger | |
| 7,918,718 B2 | 4/2011 | Christensen et al. | |
| 9,546,968 B2 | 1/2017 | Cooke | |
| 9,854,817 B2 | 1/2018 | Elsoee et al. | |
| 2008/0200107 A1* | 8/2008 | Christensen | A22B 5/007 452/157 |
| 2015/0205288 A1* | 7/2015 | Strong | G05B 19/4185 700/114 |
| 2021/0227840 A1* | 7/2021 | Blaine | B26D 5/007 |

FOREIGN PATENT DOCUMENTS

| | | |
|---|---|---|
| GB | 2247524 B | 4/1994 |
| WO | 2005/090964 A1 | 9/2005 |
| WO | 2017/191162 A1 | 11/2017 |
| WO | 2017/191163 A1 | 11/2017 |
| WO | 2018/085879 A1 | 5/2018 |

* cited by examiner

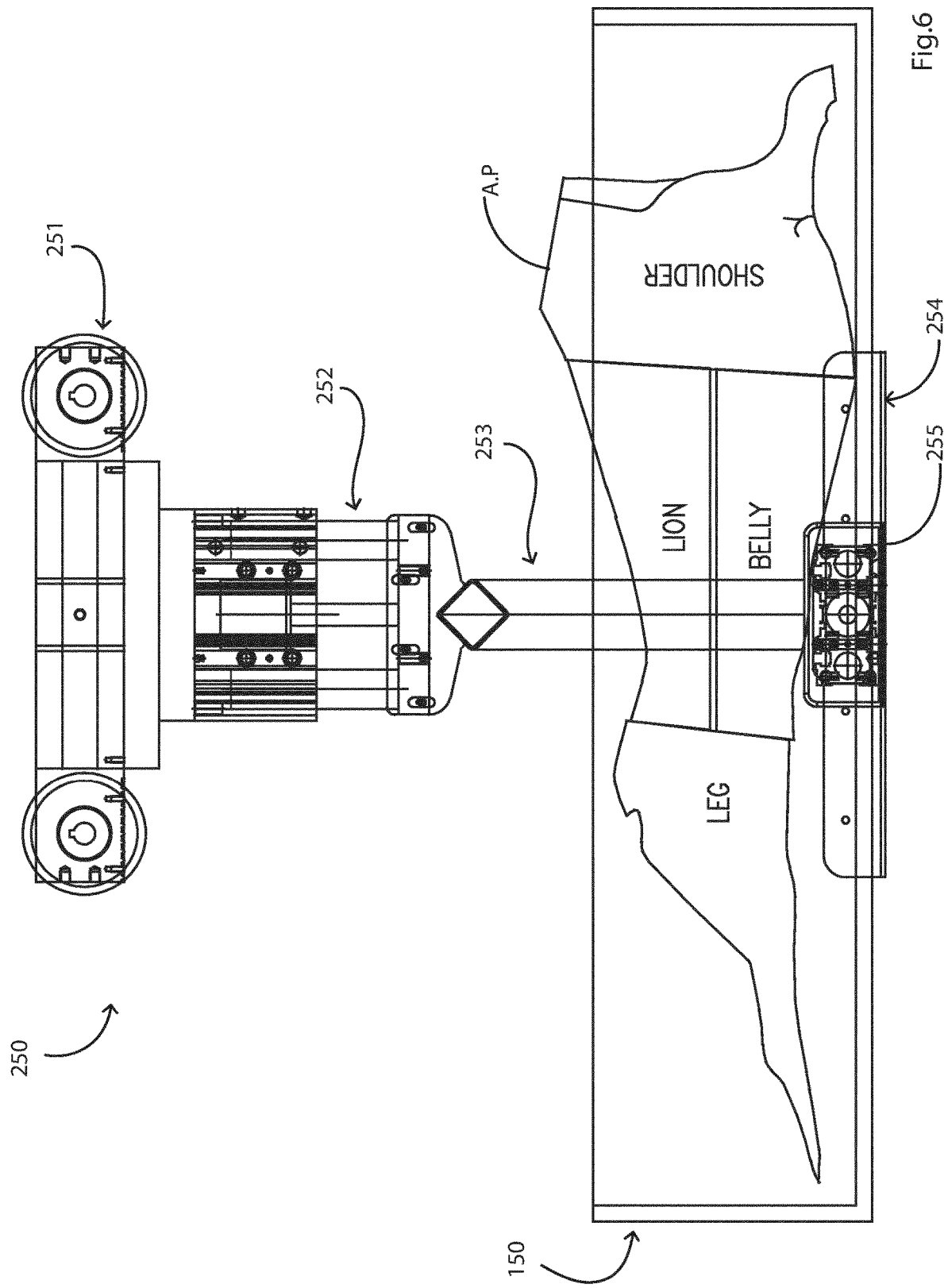

MEAT PROCESSING METHOD AND APPARATUS

INTRODUCTION

The invention relates to production of animal meat products, especially from large animals such as cattle and sheep, pre or post rigor mortis.

In typical meat production there are the major stages of:
farm animal breeding and husbandry,
slaughter,
chill,
carcass preparation,
boning, trimming, packing
slicing, etc. to meat products, and
dispatch.

There are very many factors involved in producing the final products, with customers having different requirements according to for example extent of fat present, extraneous muscle, membranes and bones, and manner of trimming.

The animal husbandry and indeed breeding, in addition to the manner of processing, has a major impact on the ultimate meat products in terms of morphology, composition & quality.

It is recognized that automated techniques to provide more information about the composition of a carcass can assist downstream tasks, especially for boning and trimming. For example, it is known (for example in CN105651776 and GB2247524) to capture images of carcasses and to apply image processing to ascertain data concerning the make-up of a carcass in terms of bone, fat, and lean meat quantity and distribution. However, the extent of information which may be derived is limited because the data is derived from light scattering and deflection from the surface.

U.S. Pat. No. 7,918,718 (Slagteriernes Forskninginstitut) describes in general terms use of an X-ray scanner in planning the production of meat products for production of attractive meat products. The movement of the conveyor belts may be stepwise or continuous movement ensuring that the location of the anatomical part is determined with the necessary accuracy at the preliminary examination. The conveyor belts are moving, so that detecting the location of the anatomical part relative to the reference points of the conveyor belt may be done during transport.

WO2017/191162 & WO2017/191163 (Teknologisk Institute, DK) describe that a CT-scanner may be used in different industrial environments such as in industry with food production e.g. at abattoirs, or other manufacturing companies handling biological materials such as meat pieces and where non-destructive imaging technology can be suitable to examine objects. The CT-scanner has a cooling system with a refrigerant for cooling the X-ray source. It is described that the surface of the conveyor belt is smooth and of a material where meat and fat do not stick to the surface.

U.S. Pat. No. 9,546,968 (Empire Tech Dev) also describes generally use of a CT scanner for manual grading.

U.S. Pat. No. 7,850,512 (Hurst Eger) describes use of a scanner fed by a conveyor belt and a clamping arrangement.

WO2018085879 (Scott Automation and Robotics) describes scanning and robotic cutting.

EP2047248 (Delipetkos) describes a method involving X-ray scanning for determining the average fat content of pieces of meat held in a container.

U.S. Pat. No. 9,854,817 (Foss Analytical) mentions a mechanical or electronic interlock to prevent the operation of one or both of a meat processing unit and an X-ray analyser. The system comprises a conveyor belt for receiving meat in an open box and an X-ray arrangement for the transmission and subsequent detection of X-rays having been transmitted through the meat in the box as it is moved by the conveyor belt.

U.S. Pat. No. 6,600,805 (Foss Electric) also describes use of X-ray beams for carcass analysis. A conveyor is arranged to carry a container such as a tray or an open box adapted to accommodate a random number of meat lumps of various sizes to be analysed, the conveyor means being arranged to let the container means pass the at least two fan-shaped X-ray beams.

WO2005/090964 (Marel HF) also describes X-ray carcass scanning of items on a conveyor.

US2008/200107 (Slagteriernes Forskningsinst) describes a method and facility for automatically determining quality characteristics of a carcass.

Computed Tomography (CT) scanners, and indeed other types of tomography scanners, are very expensive and complex items of equipment. They have been developed primarily for medical purposes, with a relatively low clarity cycle. Hence the extent of heat generated and wear-and-tear of mechanical and electronic components has not been especially challenging. If CT scanning were to be supplied to meat processing plants there are major challenges in ensuring that the equipment is reliable with the high throughputs required in an industrial manufacturing environment. Also, it is desirable to achieve optimum effective utilization of the scanning equipment due to the cost and energy consumption.

The invention addresses these issues.

SUMMARY

We describe a meat processing apparatus and we also describe a method of operation of any such apparatus.

We describe a meat processing apparatus comprising an automated analysis stage comprising a scanner with a scanner controller for analysis of meat parts such as whole or parts of carcasses. There is preferably a digital data processor linked with the scanner for processing scan data and providing outputs. The scanner is preferably a tomography scanner which can emit and receive penetrating radiation for the purposes of analysis of internal volumes of the meat part. It is in one example a computed tomography (CT) scanner in which the radiation includes X-rays. There is preferably a radiation-shielded chamber around the scanner. a port for entry and exit of anatomical meat parts placed in carriers into and out of the chamber for analysis, and a handling system for automated movement of the carriers between the port and the scanner, and a controller for the handling system.

Optionally, the port comprises an interlock chamber, having an inner door and an outer door and a controller to ensure that while the scanner is operating only one door can open. Optionally, at least one of the doors includes a lead barrier. Optionally, at least one of the doors includes a thermal insulation layer or layers. Optionally, at least one of the doors includes a polymer and/or metal coated exterior surface. Optionally, at least one of the doors has a thickness of 2 mm to 8 mm, more preferably 4 mm to 5 mm.

In one preferred example, the interlock chamber has an upper conveyor level and a lower conveyor level, one for inlet and one for outlet of carriers before and after analysis. The upper level is preferably for entry and the lower level is for exit.

Preferably, the handling system comprises a gantry and a robotic gripper arranged to move on the gantry in at least a longitudinal direction between the port and the scanner, and comprising a gripper receiver for receiving and engaging a carrier for a meat part to be analysed.

Optionally, the gripper receiver is arranged to receive a carrier moving in the longitudinal direction into a volume within the receiver, and the gripper comprises opposed seats to move laterally inwardly to engage a carrier and to retract to disengage from the carrier. Optionally, the opposed seats are L-shaped, with a vertical flange and a substantially horizontal seat configured to engage underneath a lateral edge of the carrier.

Preferably, the robotic gripper is mounted on a carriage with wheels driven to move on a rail of the gantry. Optionally, the handling system comprises a vertically-movable platform which is movable between an upper position to receive a carrier from the robotic gripper and a lower position for delivery of the carrier into the port.

Preferably, the scanner comprises a loading conveyor having a bed with a flat planar surface for supporting a carrier while allowing access by the gripper for engaging the carrier.

Optionally, at least some of the carriers comprise an open-topped shell and an insert configured to fit without significant relative movement into the shell and to support a meat part at a desired orientation.

Preferably, the insert comprises sloped internal walls forming a seat for a meat part with a stable orientation. Preferably, the shell and the insert are each of chemically corrosion resistant and abrasion resistant material with a low radiation (for example X-ray) absorptive capacity, such as monomer or co-polymer plastics.

Preferably, the shell and/or the insert each comprises one or more selected from PE (Polyethylene), PP (Polypropylene), APET ((Amorphous-polyethylene terephthalate), CPET (Crystalline Polyethylene Terephthalate), PTFE (Polytetrafluoroethylene), PET (polyethylene terephthalate), or HDPE (high-density polyethylene).

Preferably, the apparatus further comprising a jig having an elongate body and members such as pins or blades protruding from the body for assistance in marking a carcass at a desired location for cutting to fit into a carrier.

Preferably, the controller is configured to provide feedback data on meat quality determined by scanning, and for routing said feedback data to suppliers. Preferably, the scanner controller is configured to provide feedforward data to downstream processing stages for optimized boning and/or trimming (manual or automated)

Preferably, comprising a temperature controller configured to maintain an environment within the chamber with a temperature in the range of 10° C. to 22° C. Preferably, the scanner controller is configured to automatically start and automatically reset the scanner after a set number of scans.

Preferably, the apparatus further comprises a pre-scan inspection station arranged to detect volume and/or density of anatomical meat parts on a carrier and an inspection controller configured to feed corresponding data to the scanner controller, and the scanner controller is configured to modulate scanner operation according to said inspection data. This modification is effectively real time, occurring as the incoming carrier arrives, whether the carrier was inspected immediately beforehand of further upstream such as before entry to the chamber.

Preferably, the pre-scan inspection station comprises one or more sensors preferably including a position encoder linked with the inspection controller to detect position of a carrier and its meat parts. Optionally, the sensor comprises a light line scanner coupled with a digital color camera which is preferably offset, and an inspection controller configured to generate and transmit commands to the scanner controller for each particular item of meat as it is subsequently scanned on a first-in-first-out (FIFO) basis.

Preferably, the inspection controller is configured to record deflection of a structured light (for example laser) line as a carrier flows through the inspection station, and to interpret the line deflection as an indicator of change in meat depth and volume coupled with its linear position relative to a fixed datum on the carrier.

Preferably, the inspection controller is configured to interpret return of the line to its original shape as an indication of the end point of the meat part, and preferably to record this as a horizontal X position. Preferably, the inspection controller is configured to eliminate or crop images relating to the carrier alone.

Optionally, the scanner controller is configured to change scanner voltage and/or current to compensate for different anatomical meat part depth and/or volume or product artifacts so as to minimize degradation of the X-RAY tube and detector. Preferably, the scanner controller is configured to implement parameter changes for depths above a threshold.

Preferably, the handling system is adapted to sequence introduction of carriers to the scanner on the basis of a preferred scanner power usage scheme.

Preferably, the handling system is adapted to sequence carriers according to depth, volume and/or density of meat parts to facilitate scanner tube cooling, in which for example long, deep meat pieces are immediately followed by shorter and shallow meat pieces from the same or different animals, giving time in cycle for the tube to cool down and not reach maximum allowable heat dissipation.

Preferably, the inspection controller and the scanner controller are adapted to perform optimization of the scanner one or both of:

intra-carrier control, in which the scanner modulates its power consumption in real time during scanning of the meat parts in a single particular carrier, using more power where there is the greatest density and/or volume in the meat part(s) being scanned, and/or inter-carrier control, in which the carriers are fed to the scanner in a sequence in a desired pattern for optimization of the scanner power consumption and other scanner parameters.

The handling system may in some examples comprise a plurality of grippers and the controller is configured to synchronise operation of the grippers in synchronism. In such cases, preferably, the handling system comprises a gantry and a robotic gripper arranged to move on the gantry in longitudinal and transverse directions with respect to a longitudinal axis of the scanner.

Preferably, the handling system comprises a first gripper for picking a carrier from a first location and placing it onto the scanner table, a second gripper for picking a carrier from the table and placing it at a second location. The handling system may be configured to move said first and second grippers along a common axis. The axis along which the first gripper and the second gripper are moved may be substantially perpendicular to the movement (longitudinal axis) of the scanner table into and out of the scanner.

The handling system may comprise a third gripper for picking a carrier from a third location and placing it onto the scanner table, and a fourth gripper for picking a carrier from the table and placing it at a fourth location. Preferably, the third gripper and the fourth gripper are moved synchronously along a further common axis. The further axis along which the third gripper and fourth gripper move may be substantially perpendicular to the movement of the table.

The handling system may be configured such that a carrier is able to enter the scanner from one side and to exit the scanner at the opposite side.

Preferably, the carrier and/or the table are at least partially covered with a food-grade finish.

In another aspect we describe method for carrying out a scan of meat parts in carriers using an apparatus of any example described herein, the method comprising the steps of picking a carrier carrying the object from a first location and placing it onto a table of the system by means of a first gripper,
moving the carrier with the meat parts into a gantry of the handling system, performing the computed tomography scan of the parts by means of emitting radiation such as X-rays from a source onto the parts, detecting the emitted radiation by a detector and converting them into electrical signals,
moving the carrier with the parts out of the scanner, and picking the carrier from the table and placing it at a second location by means of a second gripper The first gripper and the second gripper may be moved along a common axis.

In another aspect, we describe a handling system for a scanner having a scanner controller, the handling system being adapted to perform automated movement of meat part carriers between a port and the scanner. The port may be for a shielded enclosure chamber within which the scanner is located.

Preferably, the handling system comprises a gantry and a robotic gripper arranged to move on the gantry in a longitudinal or transverse direction between the port and the scanner, and comprising a gripper receiver for receiving and engaging a carrier for a meat part to be analysed. Preferably, the gripper receiver is arranged to receive a carrier moving in the longitudinal direction into a volume within the receiver, and the gripper comprises opposed seats to move laterally inwardly to engage a carrier and to retract to disengage from the carrier.

Preferably, the opposed seats are L-shaped, with a vertical flange and a substantially horizontal seat configured to engage underneath a lateral edge of the carrier. Preferably, the robotic gripper is mounted on a carriage with wheels driven to move on a rail of the gantry.

Preferably, the handling system comprises a vertically-movable platform which is movable between an upper position to receive a carrier from the robotic gripper and a lower position for delivery of the carrier into the port.

Preferably, the scanner comprises a loading conveyor having a bed with a flat planar surface for supporting a carrier while allowing access by the gripper for engaging the carrier.

Preferably, at least some of the carriers comprise an open-topped shell and an insert configured to fit without significant relative movement into the shell and to support a meat part at a desired orientation. The insert may comprise sloped internal walls forming a seat for a meat part with a stable orientation.

Preferably, at least some of the carriers comprise an open-topped shell and an insert configured to fit without significant relative movement into the shell and to support a meat part at a desired orientation. Preferably, the shell and the insert are each of chemically corrosion resistant and abrasion resistant material with a low X-RAY absorptive capacity, such as monomer or co-polymer plastics.

Preferably, the shell and/or the insert each is of PE (Polyethylene), PP (Polypropylene), APET ((Amorphous-polyethylene terephthalate), CPET (Crystalline Polyethylene Terephthalate), PTFE (Polytetrafluoroethylene), PET (polyethylene terephthalate), or HDPE (high-density polyethylene).

In some cases, the handling system comprises a plurality of grippers and the controller is configured to synchronise operation of the grippers in synchronism.

Optionally, the handling system comprises a gantry and a robotic gripper arranged to move on the gantry in longitudinal and transverse directions with respect to a longitudinal axis of the scanner.

Optionally, the handling system comprises a first gripper for picking a carrier from a first location and placing it onto the scanner table, a second gripper for picking a carrier from the table and placing it at a second location. Optionally, the handling system is configured to move said first and second grippers along a common axis. Optionally, the axis along which the first gripper and the second gripper are moved is substantially perpendicular to the movement (longitudinal axis) of the scanner table into and out of the scanner.

Optionally, the handling system comprises a third gripper for picking a carrier from a third location and placing it onto the scanner table, and a fourth gripper for picking a carrier from the table and placing it at a fourth location.

Optionally, the third gripper and the fourth gripper are moved synchronously along a further common axis. Optionally, the further axis along which the third gripper and fourth gripper move is substantially perpendicular to the movement of the table. Optionally, the handling system is configured such that a carrier is able to enter the scanner from one side and to exit the scanner at the opposite side.

In another aspect, we describe in various examples a meat processing scanner control apparatus comprising a scanner controller and an inspection station with an inspection controller, in which the inspection station is arranged to detect volume and/or density of anatomical parts on a carrier and the inspection controller is configured to feed corresponding data to the scanner controller, and the scanner controller is configured to modulate scanner operation according to said inspection data.

Optionally, the inspection station comprises one or more sensors linked with the inspection controller to detect position of a carrier and its anatomical parts. Optionally, the sensor comprises a laser line scanner coupled with offset digital color camera, and an inspection controller configured to generate and transmit commands to the scanner controller for each particular item of meat as it is subsequently scanned on a first-in-first-out (FIFO) basis.

Preferably, the inspection controller is configured to record deflection of a structured laser line as an item of meat flows through the inspection station, and to interpret the line deflection as an indicator of change in meat depth and volume coupled with its linear position relative to a fixed datum on the carrier.

Preferably, the inspection controller is configured to interpret return of the line to its original shape as an indication of the end point of the meat item, and preferably to record this as a horizontal X position. Preferably, the inspection controller is configured to eliminates (crops) images relating to the carrier alone. Preferably, the scanner controller is configured to change scanner voltage and/or current to compensate for different anatomical part depth and/or volume so as to minimize degradation of the X-RAY tube and detector.

Preferably, the scanner controller is configured to implement parameter changes for depths above a threshold.

Preferably, the handling apparatus is adapted to sequence introduction of carriers to the scanner on the basis of a preferred scanner power usage scheme.

Preferably, the handling apparatus is adapted to sequence carriers according to volume and/or density of meat parts to facilitate scanner tube cooling, in which for example long, deep meat pieces are immediately followed by shorter and shallow meat pieces from the same or different animals, giving time in cycle for the tube to cool down and not reach maximum allowable heat dissipation.

Preferably, the inspection controller and the scanner controller are adapted to perform the optimization of a scanner by one or both of:
  intra-carrier control, in which the scanner modulates its power consumption in real time during scanning of the meat in a single particular carrier, using more power where there is the greatest density and/or volume in the meat part being scanned, and/or
  inter-carrier control, in which the carriers are fed to the scanner in a sequence which helps avoid over-heating and achieve good reliability, with small, medium, and large anatomical parts being delivered to the scanner in a desired pattern for optimization of the scanner power consumption and/or other scanner parameters.

In a further aspect we describe a method of operating aa meat processing apparatus of any example, the method comprising the steps of placing anatomical parts in carriers, controlling the handling system to convey the carriers into and through the port, to the scanner, into the scanner, out of the scanner, back to the port, and out of the port to exit the chamber. Preferably, the anatomical parts which are placed in the carrier in a stable manner, either as a full carcass of a smaller animal such as lamb or one or more parts of a larger carcass such as beef.

Preferably, the apparatus comprises a jig having an elongate body and members such as pins or blades protruding from the body, and the method includes the steps of an operator applying the jig to a carcass and the members of the jig indicating locations for cuts to the overall length of the carcass to fit into a carrier and/or for assistance in marking a carcass at a desired location for cutting to fit into a carrier. The carcass may be post rigor mortis onset or completion or pre rigor mortis onset or completion.

Preferably, the anatomical parts are placed on the carriers according to a scheme to optimize or modulate the flow rate of meat volume into the scanner.

Preferably, the inspection controller and the scanner controller are adapted to perform the optimization of a scanner by one or both of:
  intra-carrier control, in which the scanner modulates its power consumption in real time during scanning of the meat in a single particular carrier, using more power where there is the greatest density and/or volume in the meat part being scanned, and
  inter-carrier control, in which the carriers are fed to the scanner in a sequence which helps avoid over-heating and achieve good reliability, with small, medium, and large anatomical parts being delivered to the scanner in a desired pattern for control of the scanner power consumption and/or other scanner parameters.

Preferably, the scheme alternates larger and smaller sizes of anatomical parts placed on successive carriers for entry to the port. Preferably, the meat parts are inspected automatically by an inspection station and a controller of the inspection station feeds forward data which is used by the scanner controller to control scanner operation according to meat part physical attributes.

Preferably, the carcasses are delivered to the port on a support such as a hanger which has an identifier, the carrier is marked with the same identifier, and there is matching of the anatomical parts with the originating support after exit from the port for traceability.

In another aspect we describe a meat quality and yield improvement process performed using an apparatus of any example described herein, the process comprising routing meat parts from the scanner to a trimming and/or boning hall and feeding forward instructions for an automatic trimming and/or boning equipment according to meat part physical data determined by the scanning.

In another aspect, we describe a carrier comprises an open-topped shell and an insert configured to fit in the shell without significant relative movement in the shell and to support a meat part at a desired orientation. This is particularly suited to conveying one or more meat parts through a scanner such as a CT scanner.

DETAILED DESCRIPTION OF THE INVENTION

The invention will be more clearly understood from the following description of some embodiments thereof, given by way of example only with reference to the accompanying drawings in which:

FIG. 6 shows a robotic gripper in use, for delivery of an anatomical part to/from the scanner.

Figure 1:
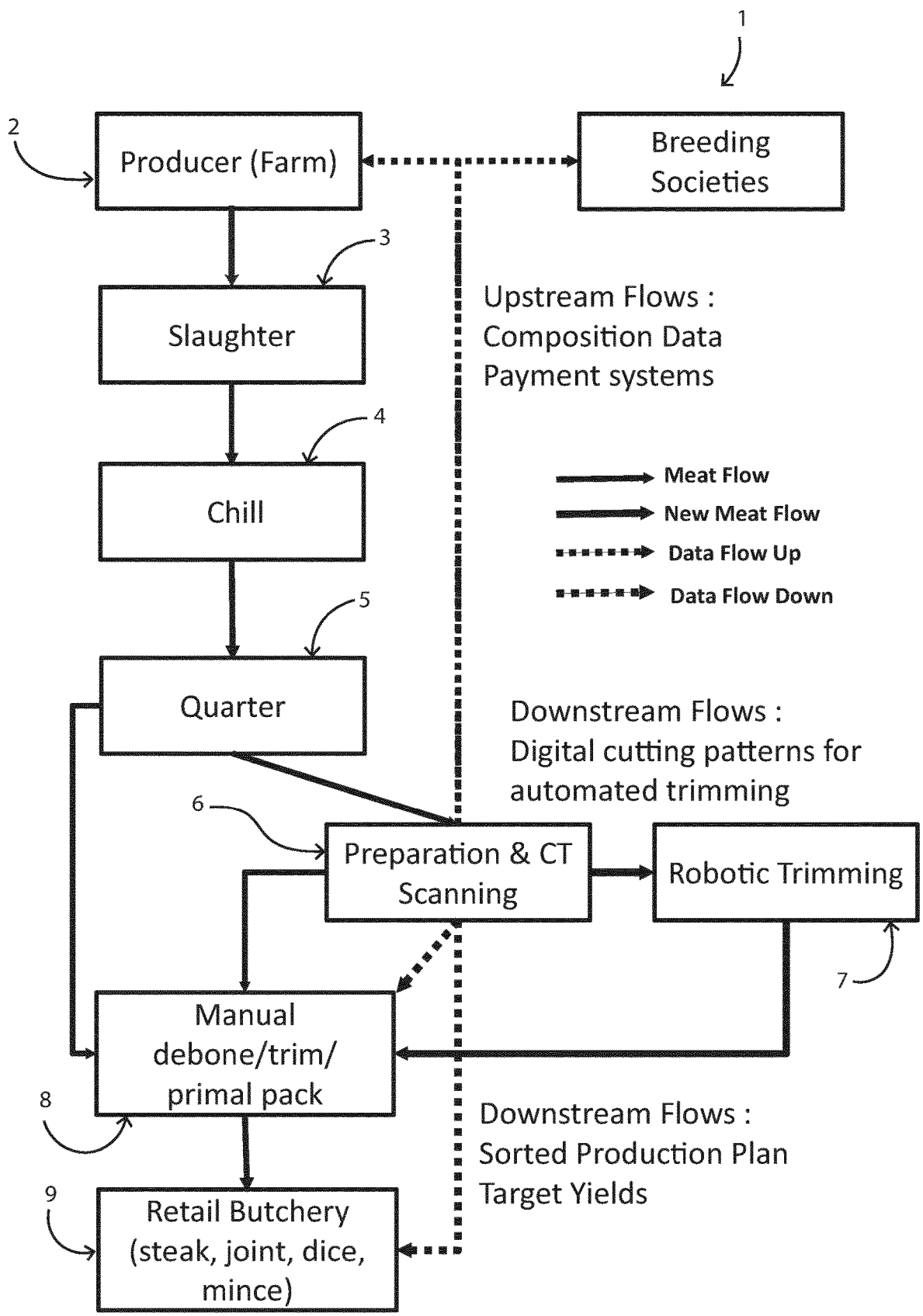
FIG. 1 is a flow diagram for a meat processing flow from farm to retail, in which the meat processing is performed with an apparatus as described herein.

Referring to FIG. 1, the major stages of a meat product production process 1 are as follows:
  2, breeding and animal husbandry on farm; using data from stage 6, see below;
  3, slaughter, also using data from stage 6;
  4, chill;
  5, quarter, cutting to major portions, also using data from stage 6;
  6, CT (computed tomography) scanning and its preparations thereof;

7, robotic trimming using data from stage 6;

8, manual debone, tripping, and primal packing using data from stage 6; and 9, retail butchery using data from stage 6.

The meat processing steps are implemented by an apparatus including apparatus as described below. In the scanning stage there is a scanner (230, see below) scanning with an X-ray source for emitting X-rays, an X-ray detector for detecting the emitted X-rays and a processor for converting them into electrical signals which are processed by digital data processors. The apparatus (or "production plant") is arranged to continuously supply the scanner with unscanned objects (anatomical parts) in the carriers and to remove the carriers from it and convey them back to the downstream stage 7.

The various arrows indicated by the legend show that there are major data flows for optimization of the overall process. These include scanning data being processed by a server (local and/or cloud-based) to digitize the supply chain. This provides to the animal producer quantified data concerning applicable aspects such as quantity and distribution of lean, fat and bone proportion by weight. animal value and key morphological features (for example, rib-eye size, back fat depth). This information is of benefit to the producer as feedback for improvement in breeding and management of livestock. There is also considerable feedforward information to assist with trimming and boning. This feedforward data is in the form of numerical data outputs, three-dimensional (3D) contour maps and virtual butchering data. This drives production planning & sorting decisions, setting of production butchery targets to control processes, automated/robotic trimming/boning, and also interface instructions to operators for manual trimming, boning and packing throughout the butchery process.

Figure 2:
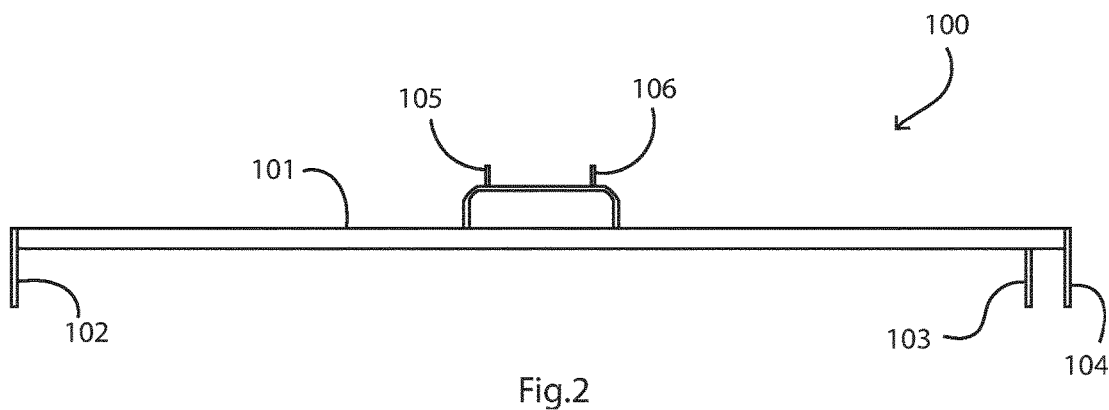
FIG. 2 is a view of a jig for carcass marking.

Referring to FIG. 2 a jig 100 is used at an early stage of the process when a carcass is taken from chilling. The jig has an elongate light-weight, solid or tubular body 101, forward members 102, 103 and 104, and also rear-facing members 105 and 106.

The operator applies the jig to precise locations on the carcass so that the blades 102 and 104 define the longitudinal limits of a carrier (150, see below) for the scanner. The carcass is marked using a knife using the members 102-106 for guidance so that the carcass can be cut to the maximum length. The member 103 indicates location for a rump quarter portion cut. On reversing the jig 100 the members 105 and 106 indicate and mark positions for loin tail length.

The carcass preparation involves cutting at the locations indicated by the jig 100 so that all important anatomical parts are selected and then provided for optimum placement in a carrier for CT scanning. The locations and dimensions of the jig ore only given by way of example, and may be of any desired configuration to suit the nature of the carcasses and dimensions of the carrier. In this example lamb carcasses are analyzed whole, while beef carcasses are cut according to marking done with assistance of the jig 100. However, it may be arranged that a lamb carcass is portioned also, depending on the scanning parameters.

Figure 3A:
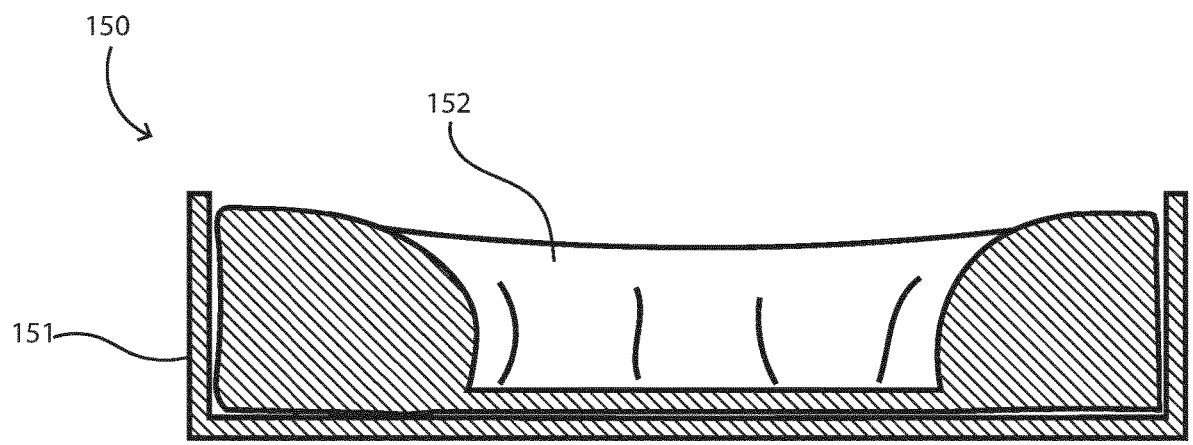
FIG. 3(*a*) is a diagrammatic sectional side view of a carrier for an anatomical part during scanning, and FIG. 3(*b*) is a plan view showing two lamb carcasses supported in a carrier.
Figure 3B:
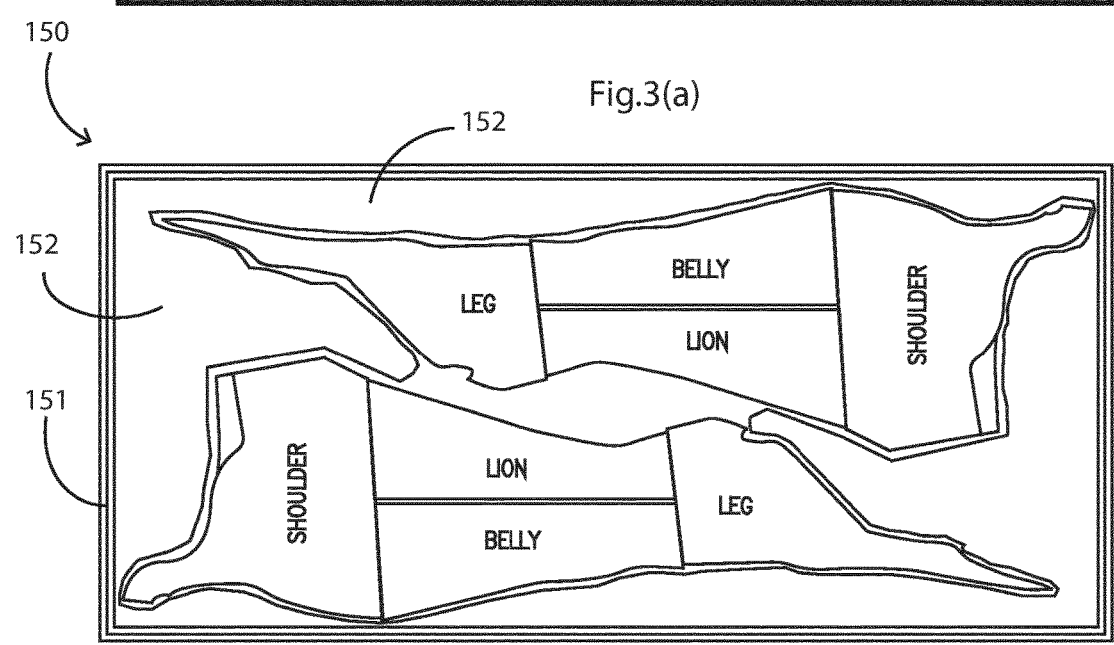

Referring to FIG. 3(*a*), an anatomical part carrier 150 comprises an open rectangular box shell 151 and an insert 152. The insert 152 fits with a friction fit with or without location dowels in the shell 151, in a manner which allows easy insertion and removal of the insert 152, for interchangeability. The insert 152 is configured with a curved internal profile for support of the anatomical part in a manner which does not allow movement during scanning, and also provides the desired orientation for optimum signal/noise ratio scanning, minimum scan artifacts and simpler software reconstruction and image manipulation.

The material of the shell 151 and of the insert 152 are strong, smooth, chemically corrosion-resistant, abrasion-resistant with a low XRAY absorptive capacity, such as monomer or co-polymer plastics. Preferred examples are PE (Polyethylene), PP (Polypropylene), APET ((Amorphous-polyethylene terephthalate), CPET (Crystalline Polyethylene Terephthalate), PTFE (Polytetrafluoroethylene), PET (polyethylene terephthalate), or HDPE (high-density polyethylene). It is preferred that the shell 151 be of high-density polyethylene (HDPE), and that the insert is also of HDPE.

In one example the dimensions are 350 mm high, 660 mm wide and 1390 long.

The material may be clear, translucent or opaque. The parts have smooth surfaces with no protrusion to meat trap contamination spaces.

As set out in the description below, the carrier allows very efficient loading of the parts for inspection and also very accurate inspection in a repeatable manner. Also, the carriers 150 may be easily re-configured by replacement of the inserts 152 as applicable for the anatomical parts to be analyzed according to production requirements.

In other embodiments there may be locating male/female features such as dowel pins. In some applications (especially lamb) the carrier inserts 152 may be configured to contain more than one piece of meat in a precise orientation with optimum use of space to maximize system capacity while transferring through the CT scanning aperture. This is illustrated in FIG. 3(*b*).

Figure 4:
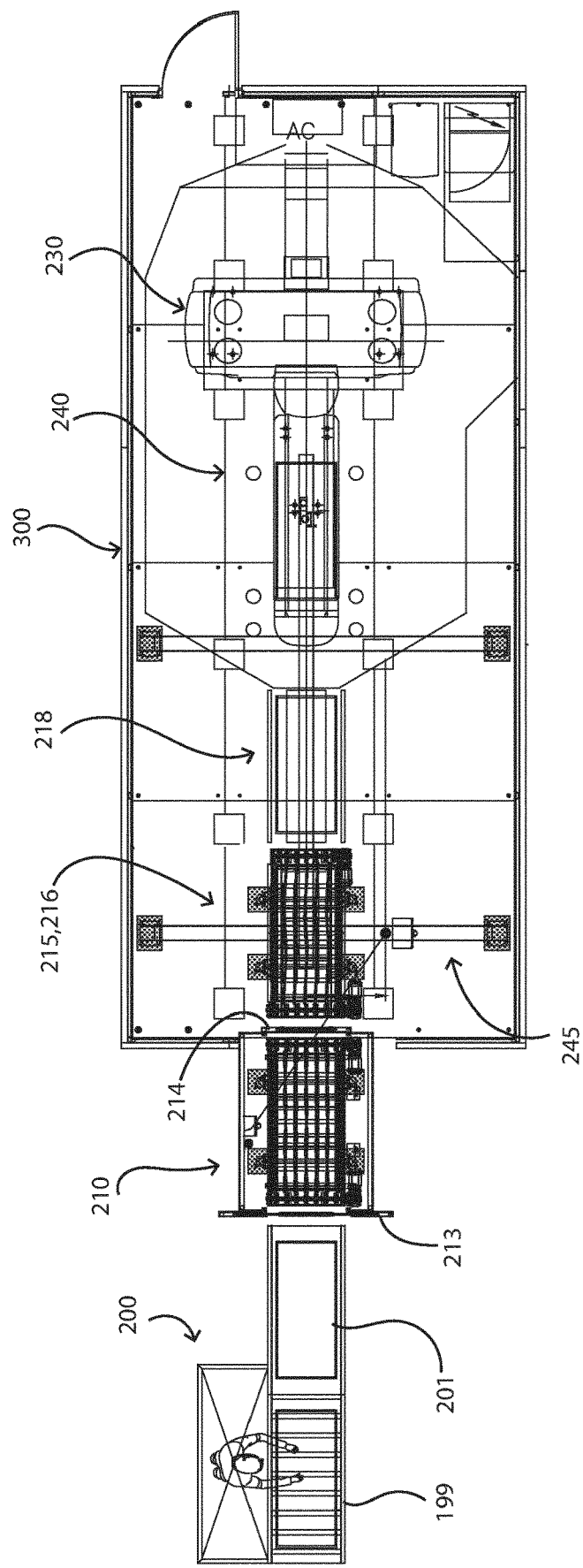
FIGS. 4 and 5 are plan and elevational views respectively of a part of a processing apparatus, including delivery to a CT scanning chamber and the chamber itself.
Figure 5:
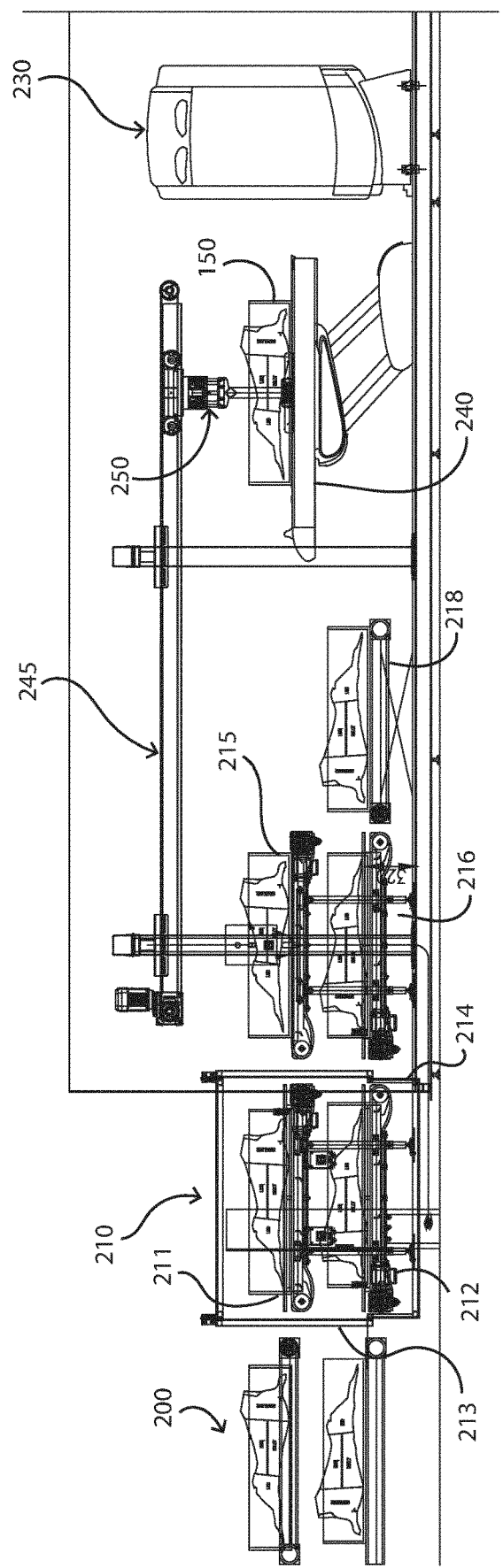

Referring to FIGS. 4 and 5 the stage 6 is shown in detail. The major components are:

200, Carcass/anatomical part handling, with placement on carriers 150. The placement stage 200 has a static conveyor with individually rotating rollers 199 aligned with an upper conveyor 201, and underneath the upper conveyor 201 there is a lower conveyor 202.

210, Interlock zone. This has a top level 211 for inlet of carriers 150, and a lower level outlet 212 for outlet of carriers. At the ends of this zone there is an outer lead sliding door 213 (preferably 2 mm to 8 mm, more preferably 4 mm to 5 mm), and an inner lead sliding door 214 for prevention of escape of X-ray radiation scatter from the scanning chamber 300 and conditioned air to/from chamber 300. The latter is a radiation-sealed, food quality demountable enclosure for protection of staff and environmental control, the production apparatus being arranged so that there is no need for personnel inside this room during production. The interlock zone is the single port on entry and exit to and from a shielded chamber 300, the chamber 300 providing a radiation shield for protecting humans from the X-rays emitted from the X-ray source of the scanner 230. The doors may include in various examples thermal insulation layers, and their exterior surfaces may be provided by a polymer or metal.

245, Robotic handling gantry between the interlock zone 210 and a CT scanner 230. The gantry 245 supports and drives a robotic gripper 250, described in more detail below. The robotic gripper operates between a buffer stage, with an upper carrier support conveyor belt 215 and a lower carrier support belt 216, both immediately inside of the interlock stage 210.

218, A scissors-jacked transfer platform 218, for carriers pending exit.

240, A scanner loading couch 240 for supporting a carrier 150 in the scanner 230, the couch having a food-grade finish.

250, A robotic gripper 250 for automatic movement of carriers within the chamber 300, with optimum use of space, in two dimensions X and Z. The gripper payload is typically in the range of 20 kg to 100 kg.

In this example the carrier handling is in-line in the longitudinal and vertical directions only, however as set out in a different section of the description below it may be in all three dimensions X, Y, and Z.

Figure 7A:
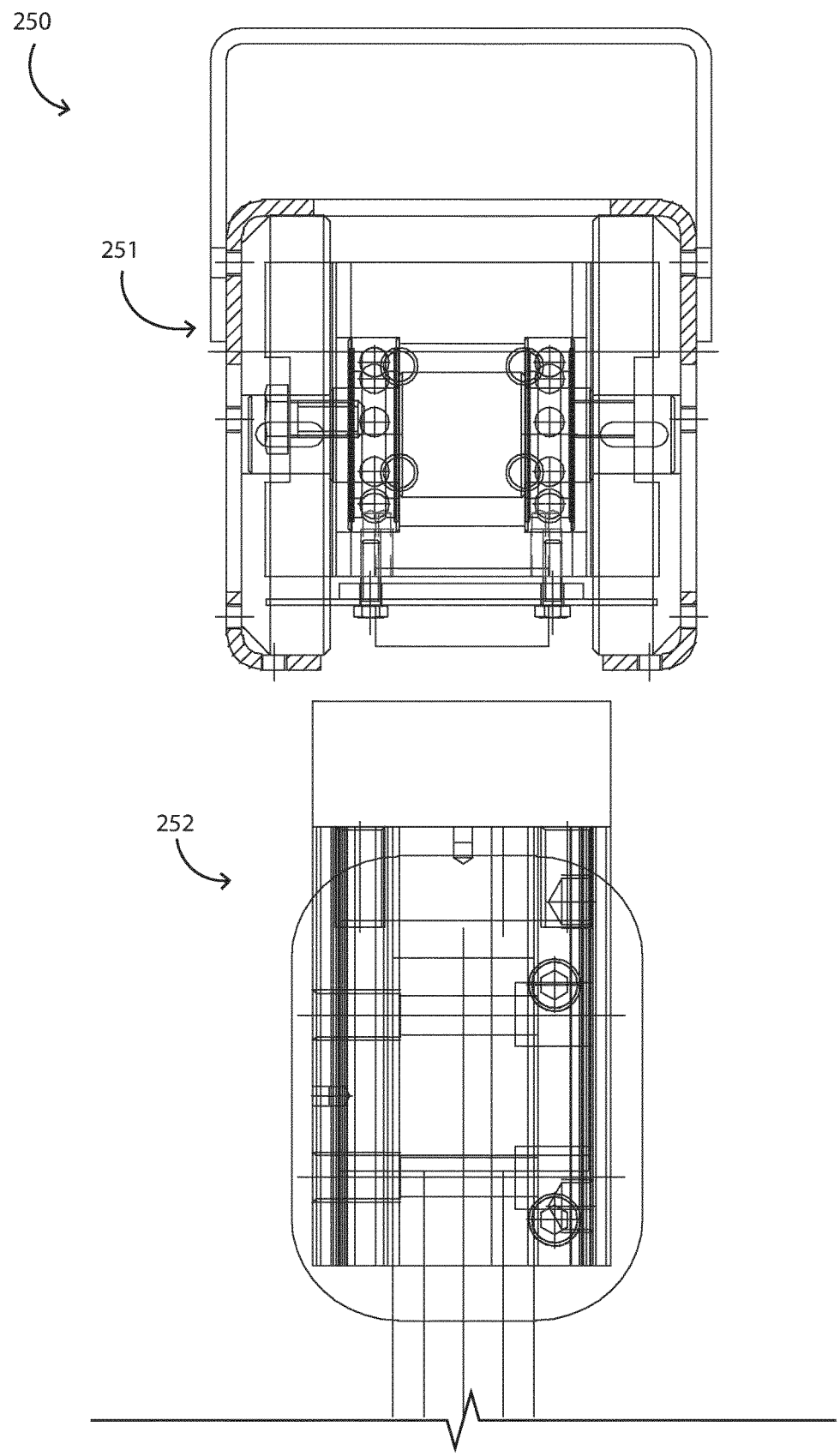
FIGS. 7(*a*) and (*b*) are together a more detailed view of the robotic gripper.
Figure 7B:
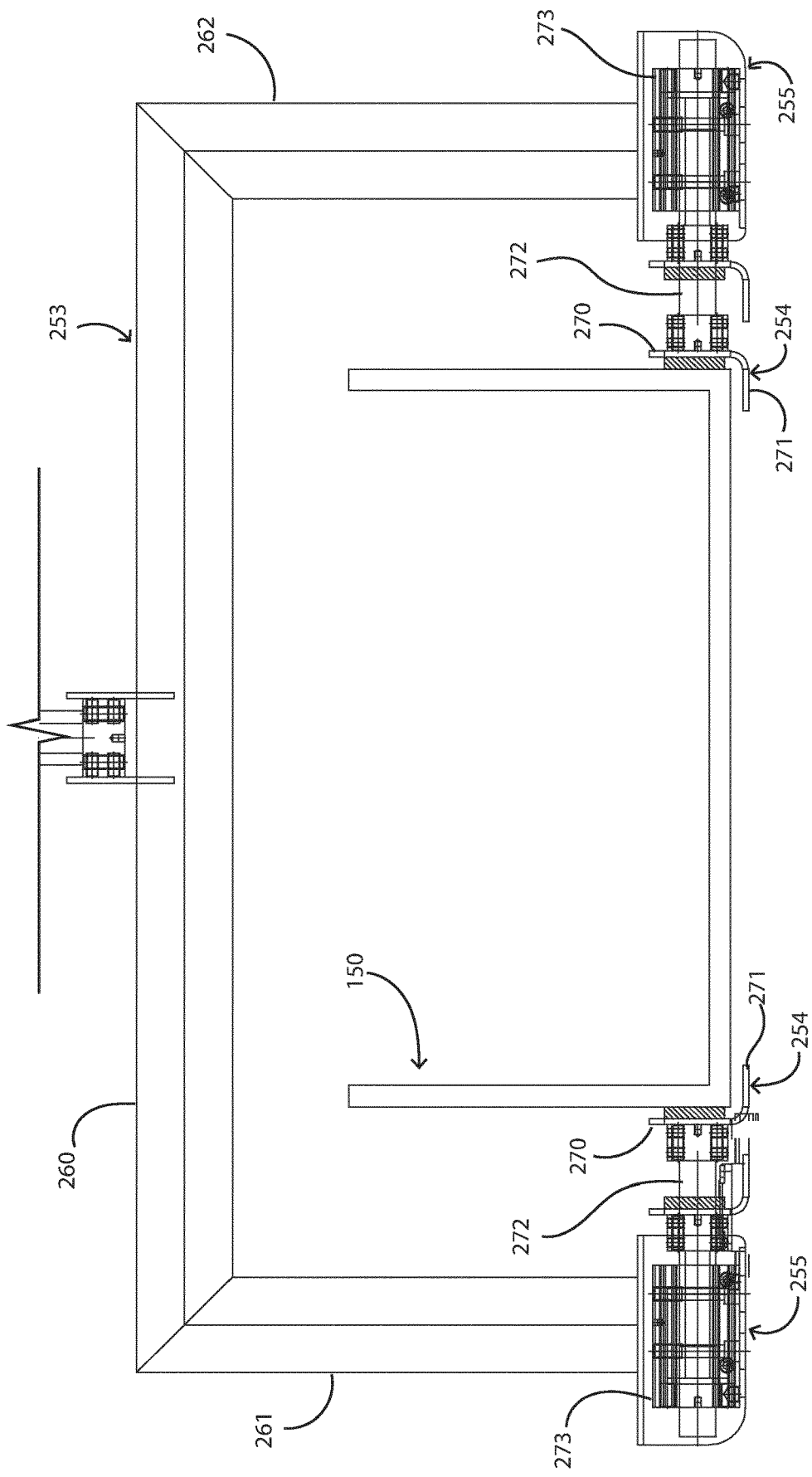

Referring to FIGS. 6 and 7 the robotic gripper 250 comprises an overhead carriage 251 which runs on the gantry 245 in the longitudinal direction from the interlock stage 210 to the scanner 230. The robotic gripper 250 also comprises a housing 252 below the carriage 251, containing electric actuator or other actuators (for example pneumatically-controller, but preferably electrical) for lowering/raising the gripper 250 vertically (Z axis). The gantry is driven by a motor on the gantry at one end by a power train which is in this example a belt and sprocket drive, but in other examples may be a ball lead screw, a rack and pinion, and providing upper structural support for the downwardly-depending components. It supports a cross beam 260, at each end of which there are downwardly depending vertical arms 261 and 262, these three components defining a zone within which carriers are received.

At the lower end of each arm 261 and 262 there is an L-shaped (in cross-section) elongate seat member 254. The seat members 254 face each other and are moved in opposing manner to converge towards a carrier 150, as best shown in FIG. 7(*b*). This drawing shows the seat members 254 at both the retracted positions and the extended carrier-engaging positions, driven by pneumatic drives 255 (which may alternatively be hydraulic, electrical). The pneumatic actuators 255 move pistons 272 attached to the members 254, the connection being at a vertical flange 270 from which extends a horizontal ledge 271 for engaging the underneath edge of a carrier 150. This arrangement achieves a pick-up point of least movement, deformation and stress on the carrier 150.

A system controller (not shown) operates so that the receiver 253 acts in a passive manner, with the carrier 150 being moved in the longitudinal direction into the space within the receiver 253 by the powered couch 240 or powered carrier belt 215. One example is that it receives the carrier from the interlock upper conveyor 215, and another is the scanner couch 240 which moves the carrier out from the scanner 230 into position within the awaiting receiver 253.

Figure 8:
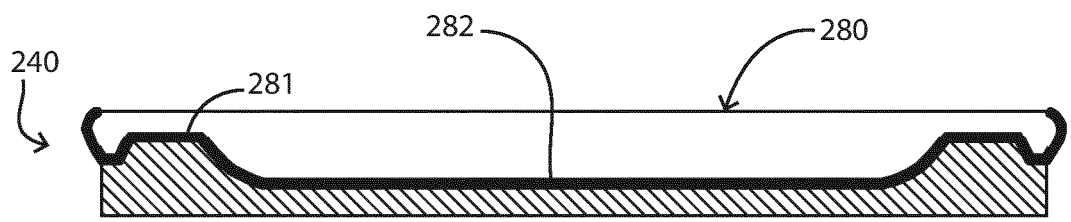
FIG. 8 is an end view of a board for attachment to a CT scanner carrier support.

Referring to FIG. 8 the couch 240 has an innovative upper board 280 with a flat carrier-supporting surface 282, and a pair of lateral rims 281 for retaining the carrier laterally in the couch 240. The width of the board 280 is less than the carrier width so as to leave space for access by the opposed seat members 254 of the gripper 250 to carriers.

Figure 9:
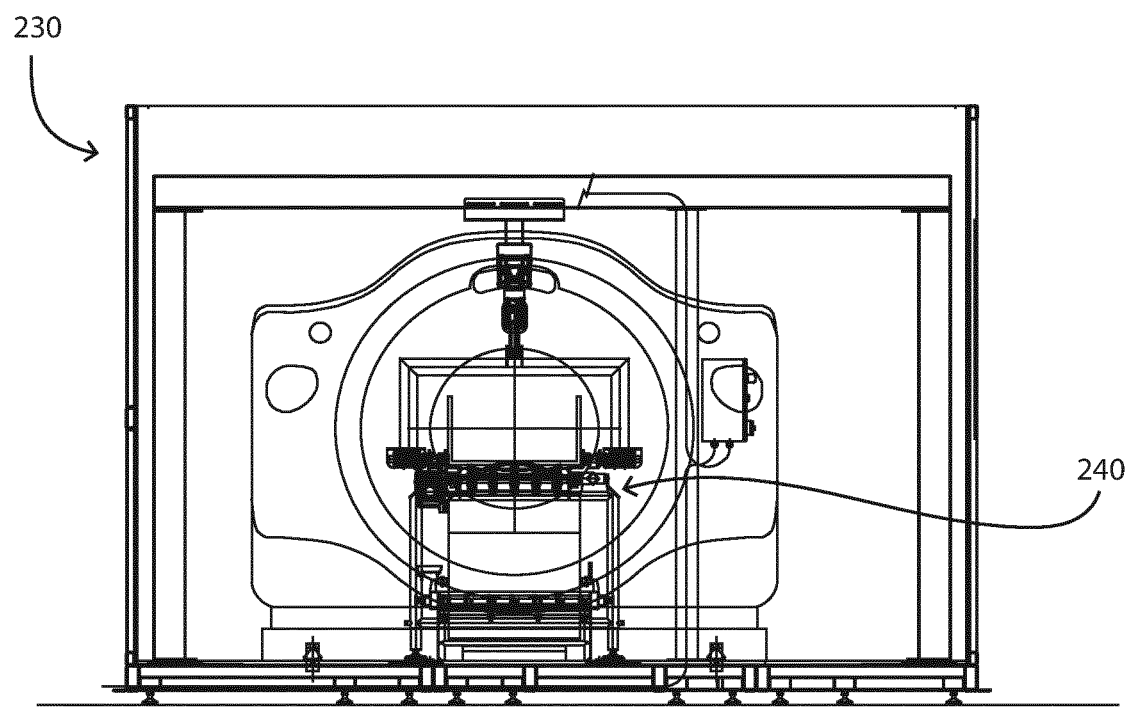
FIG. 9 is a front view of the scanner and its and the carrier support.

The scanner 230 is shown in front view in FIG. 9, the couch 240 being aligned with the scanner's tunnel. In this example the scanner is of the type which has only one entry and exit port for the object being analyzed. The CT scanner technology has developed over the years with this as the established arrangement, primarily for medical use. The invention is able to avail of such an established arrangement despite the fact that the application is industrial, with a much higher throughput than is the situation for medical examination. This has been achieved by the carrier-handling components described above.

Figure 10:
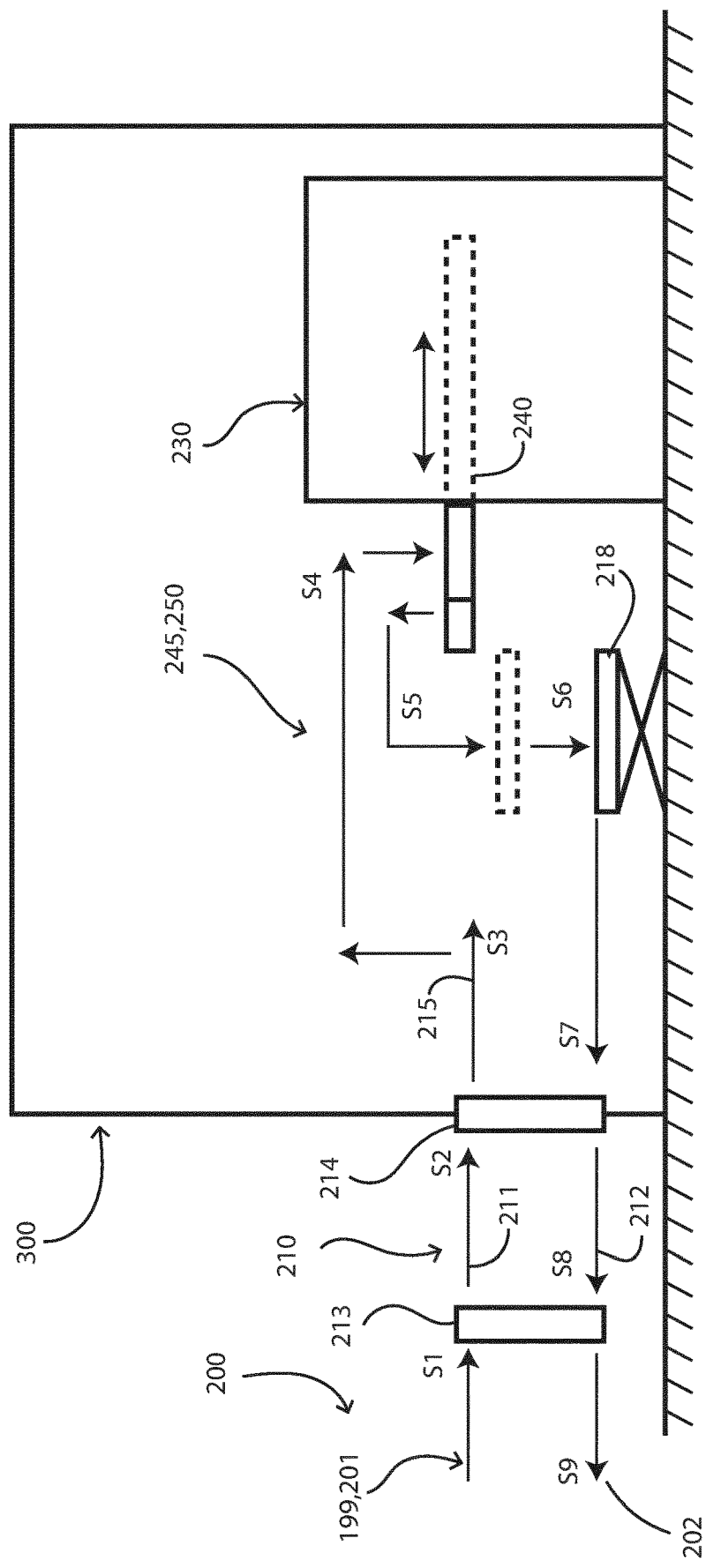
FIG. 10 is a sketch illustrating the major flows into, out of, and within the scanner chamber.

Referring to FIG. 10, the following are the movement steps.

S1, The carrier is loaded by being placed on the dead roller conveyor 199 from where it is slid onto the upper conveyor 200 to avoid damage to the upper conveyor 200 and product movement. The top conveyor 201 of the preparation stage 200 is aligned with the top conveyor 211 of the interlock zone 210.

S2, Movement into the interlock zone top level 211, with opening of the outer door 213 while the inner door 214 is closed.

S3, From the interlock zone 210 with closing of the outer door 213, movement of the conveyors 211 and 215, and opening of the inner door 214.

S4, Pick-up by the robotic gripper 250 in a movement vertically up, longitudinally towards the scanner 230, and vertically down onto the scanner conveyer ("couch") 240.

S5, After scanning, the scanner conveyor 240 is moved back out on the same side as entry and the carrier 150 is picked up by the gripper 250. The movement is up, along towards the interlock zone 210 and lowering onto the scissors-jacked platform 218. This acts as a buffer location, and avoids need for the gripper 250 to travel back the full distance towards the interlock stage 210. This allow the possibility of two grippers 250 being mounted on the gantry 245, so that at the same time one can receive an inlet carrier 150 from the conveyor 215 and the other can deposit a post-scanner carrier 150 onto the platform 218.

S6, Downward movement of the platform 218 under action of the scissors jack. The combination of the gripper 250 and the platform 218 mean that there is relatively little requirement for overhead height for equipment above the top position of the gripper. This also minimizes cycle time, maximizes capacity, and minimizes enclosure height.

S7, Movement longitudinally, by rotation of the conveyor belt at the lower level height, towards the interlock zone 210.

S8, Movement into the interlock zone 210 lower level 212, with opening of the inner door 214 while the outer door 213 is closed. This step is preferably synchronized with the step S3.

S9, Delivery from the interlock zone 210, with opening of the outer door 213 while the inner door 214 is closed.

In these steps for use of the apparatus, the carcass may be post rigor or pre rigor. The anatomical parts are preferably placed on the carriers according to a scheme to optimize or modulate the flow rate of meat volume into the scanner. For example, this scheme may alternate larger and smaller sizes of anatomical parts placed on successive carriers for entry to the port. Also, the carcasses are preferably delivered to the port on a support such as a hanger which has an identifier, the carrier is marked with the same identifier, and there is matching of the anatomical parts with the originating support after exit from the port for traceability.

The carrier 150 is seated, for entry to the scanner, on the loading conveyor 240, which has the board 280 which has a substantially planar base and a raised edge, allowing convenient gripping by the robotic gripper 250, shown in FIG. 7. Advantageously, the gripper 250 awaits movement of the carrier 150 into its volume with the gripper seats members 254 moving inwardly so that they underlie the carrier 150 and so grip it so that it can be moved according to S5. Likewise, the gripper 250 is passive until the carrier 150 is moved into its zone for commencement of the movement S4.

The scanner chamber 300 in maintained shielded for radiation safety, and for optimum scanner operation the environment is maintained at preferably 10° C. to 22° C.

CT Scanner Arrangements

The system has an automatic control circuit to automatically start and automatically remote reset the CT scanner after a set number of scans.

The CT scanner 230 has tube cooling for the high-throughput use, power modulation, and a fast return stroke, CT scan occurs under conditions to optimize image quality, tube life, and safety (80-140 kV, 10-800 mA, 10-20 secs. 800 mm maximum width tunnel & field of view).

Scanner Optimization

Figure 11:
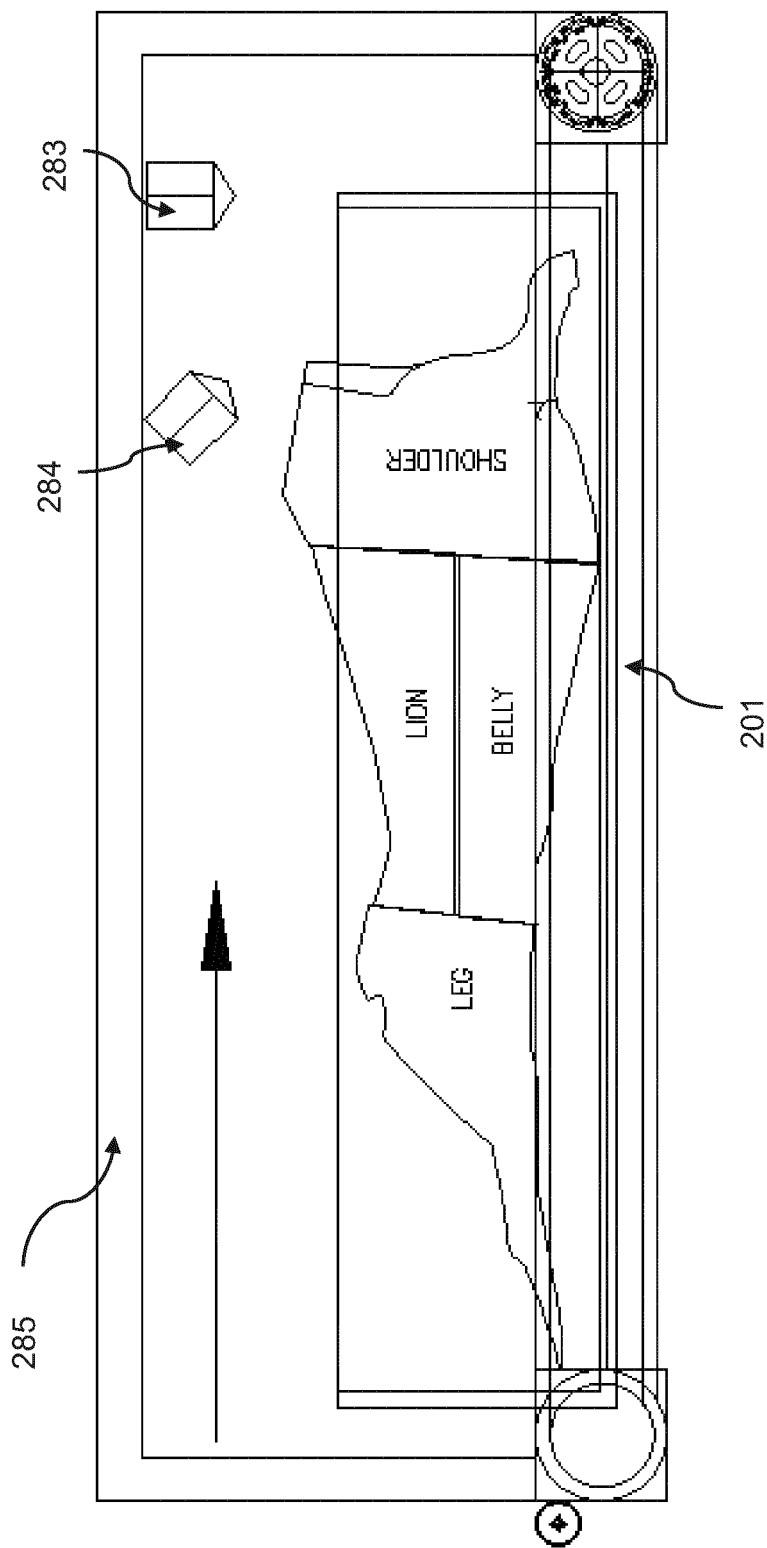
FIG. 11 shows a pre-scanner inspection system.

Referring also to FIG. 11, CT power is modulated during a CT scan based on meat profile and length automatically inputted during S1 using an incoming pre-scan inspection station with an inspection controller. In one example this is located before the stage 200 as there is more available space and the inspection can be done as part of loading the carriers and conveying them towards the interlock port 210. However, in other examples the inspection station can be located at any desired position before the scanner, including immediately before the scanner as the carriers are loaded onto the scanner couch. The inspection station includes a belt conveyor 201, and a position encoder. A carrier with orientated meat piece(s) inside is routed through the inspection station, which detects a meat profile with use of an overhead laser line sensor 283 coupled with offset digital color camera 284, mounted on a food grade frame 285, and a controller with interpretation software. The pre-scan inspection controller issues commands to the CT scanner controller for that particular item of meat as it is subsequently scanned on a first-in-first-out (FIFO) basis. Deflection of the structured laser line is recorded by the camera as the carrier holding the meat part(s) is conveyed. This line deflection indicates changes in meat depth and volume coupled with its linear position relative to a fixed datum on the carrier. Return of the line to its original shape indicates the end point of the meat, at which horizontal X position is recorded. The software eliminates (crops) the images relating to the carrier alone. This data is interpreted by an algorithm which changes CT scanner voltage and current to compensate for different product depth and volume so as to minimize degradation of the XRAY tube and detector. For example, depths beyond 200 mm might necessitate parameter changes from 80 kV/30 mA to 130 kV/300 mA for a defined length along the meat. Scanning is automatically stopped when the meat overall length is exceeded.

In addition, meat parts are introduced into the scanner in a sequence to facilitate tube cooling. For example, in one scheme long, deep meat pieces are immediately followed by shorter shallow meat pieces from the same or different animals. This gives time in cycles for the scanner tube to cool down and not reach maximum allowable heat dissipation (which may in extreme cases trigger shutdown).

Conditioned air (temperature 10° C., 20% RH, 1 m/s flow rate) is provided to assist tube cooling without electronic damage.

The pre-scan inspection station may be located elsewhere, including immediately before the scanner. In the latter case there is the benefit of real time power control of the scanner according to the individual carrier, and this may be reliably achieved because it is immediately correlated to the carrier being introduced. However, it would be more difficult to manage inter-carrier flows, to for example introduce to the scanner a carrier with a small quantity of meat following a carrier with a large quantity of meat.

In general, the optimization of the scanner is achieved by one or both of:
  intra-carrier control, in which the CT scanner modulated its power consumption in real time during scanning of the meat part(s) in a single particular carrier, using more power where there is the greatest density and/or volume in the meat part being scanned or presence of features that create scan artifacts (e.g. sharp bone edges), and/or
  inter-carrier control, in which the carriers are fed to the scanner in a sequence which helps avoid over-heating and achieve good reliability, with small, medium, and large meat parts being delivered to the scanner in a desired pattern for optimization of the scanner power consumption and other scanner parameters.

Alternative Carrier and Gripper Arrangements

In the description above it is mentioned that one gripper is sufficient for the scanner in-feed and out-feed tasks. However, it is envisaged that there may be a first gripper for picking a carrier from a first location (for example 215) and placing it onto the scanner couch (240), and a second gripper for picking a carrier from the couch and placing it at a second location (for example 218) so as to increase capacity and reduce cycle time. The first gripper and the second gripper may move along a common axis in one example, preferably synchronously along the common axis which can be parallel or orthogonal or at an oblique angle to the direction of carrier travel through the scanner.

The axis along which the first gripper and second gripper are moved may be substantially parallel or perpendicular or oblique to the movement of the table into and out of the scanner.

Figure 12:
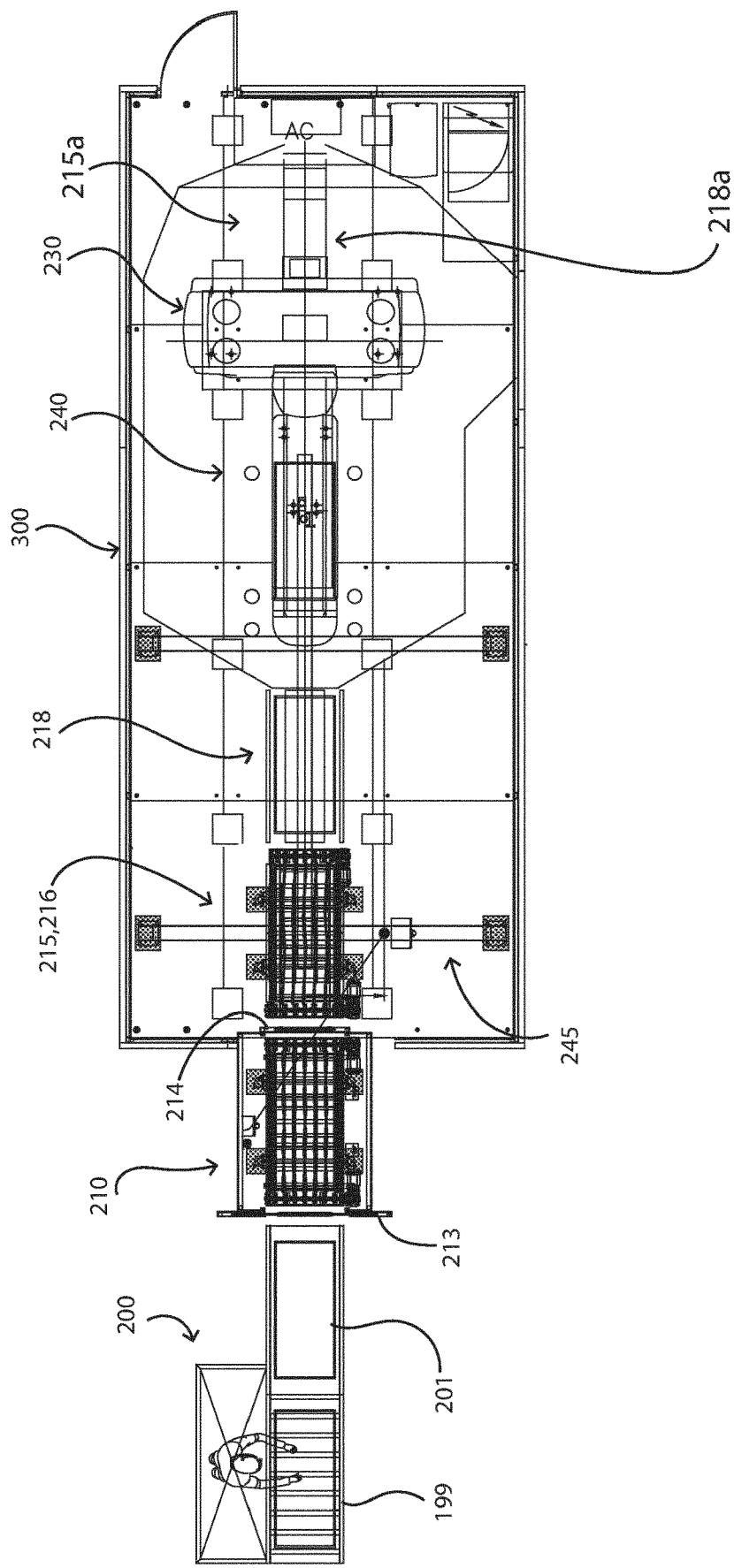
FIG. 12 shows an alternative layout of the meat processing apparatus, particularly showing access to and handling within the scanning chamber.

Referring to FIG. 12, in other examples, there may be a third gripper 250 for picking a carrier 150 from a third location (e.g. 215a) and placing it onto the scanner table ("couch") 240. Also, there may be a fourth gripper 250 for picking a carrier from the couch 240 and placing it at a fourth location such as conveyor 218a on the opposed side of the scanner, as shown in FIG. 12. The handling components may be arranged to move the third and the fourth grippers 250 synchronously along a further common axis, which axis may be substantially perpendicular or parallel or oblique to the movement of the table into and out of the scanner.

These arrangements may provide for the carriers 150 to enter the gantry from one lateral side with respect to the scanner longitudinal axis and to exit the gantry at the opposite side so as to increase system capacity by scanning a new carrier 150 during each stroke of the couch 240.

Under these arrangements the pick and place robotic gantry is a modified form of the gantry 245, having X, Y & Z axis articulation and may include rotational movements on one or more of the X, Y, and Z axes.

It is envisaged that the chamber which protects humans from radiation encompasses only the X-ray source, the X-ray detector, and the table locally at the scanner without also encompassing the arrangement suitable for supplying the scanner couch 240 with unscanned objects and removing scanned objects from it.

In one example, in a step a), the first gripper 250 picks a carrier 150 with a yet unscanned object from a first location. The second gripper 250 is still empty, i.e. it does not carry any carrier.

In step b), the first gripper 250 and the second gripper 250 move along a common axis until the first gripper 250 with the carrier 150 carrying the yet unscanned object reaches the table 240. Subsequently, the carrier 150 is lowered down onto the table 240 and the first gripper 250 releases the carrier 150.

In step c), the table 240 with the carrier 150 moves through the gantry of the scanner. A CT scan of the object is performed. Thus, as in step c) the carrier 150 is shown once it has already travelled through the scanner 230. While the object travels through the scanner 230, the first and second gripper 250 move back to their initial positions along their common axis.

In step d), the first gripper 250 picks another carrier 150 with a yet unscanned object from the first location. At the same time, the carrier 150 with the scanned object travels back through the scanner 230 and is subsequently picked by the second gripper 250. The object may be scanned a second time while travelling back through the scanner 230 or it may not be scanned.

In step e), the first gripper 250 and the second gripper 250 move along a common axis until the first gripper 250 with the carrier 150 carrying the yet unscanned object reaches the table 240. Subsequently, the carrier 150 is lowered down onto the table and the first gripper 250 releases the carrier 150. Note that at the same time, the second gripper 250 with the carrier 150 carrying the scanned object reaches a second location.

In step f), the carrier 150 with the scanned object is released from the second gripper 250. It will be transported to the unloading station. At the same time, the table with the other carrier 150 moves through the gantry of the scanner 230. A CT scan of the object is performed. Thus, as in step f) the carrier 150 is shown once it has already travelled through the scanner 230, the carrier 150 carries a scanned object.

In step g), the first and second gripper 250 move back to their initial positions along their common axis. At the same time the carrier 150 with the scanned object travels back through the scanner 230. Optionally, it can now already be picked by the second gripper 250. The object may be scanned a second time while travelling back through the scanner 230 or it may not be scanned.

In step h), the first gripper 250 picks another carrier 150 with a yet unscanned object from the first location. In case that the carrier 150 with the scanned object has not already been picked by the second gripper 150 in step g), it needs to be picked now.

In step i), the first gripper 250 and the second gripper 250 move along a common axis in the direction denoted by the respective arrow pointing downwards. They move as far until the first gripper 250 with the carrier 150 carrying the yet unscanned object reaches the table. Subsequently, the carrier 150 is lowered down onto the table and the first gripper 250 releases the carrier 150. Note that at the same time, the second gripper 250 with the carrier 150 carrying the scanned object reaches a second location.

The steps f) to i) are preferably repeated continuously for two or more cycles.

As a result, a quasi-continuous scanning of objects is achieved leading to a high throughput. At the same time, a conventional CT scanning unit can be used including a (patient) table, i.e. without major modifications as it would be the case if the objects would cross the scanning unit on a conveyor belt. The only substantial modifications comprise adding the first and second gripper and means for moving them along a common axis.

Example of Meat Handling and Analysis.

Take section on whole animal carcass selected for scanning.

Record carcass identifier and details into a server database.

In some cases, cut the carcass into pieces to facilitate CT scanning

For each piece
1. Scan Carcass label
2. Place into carrier 150. Scan carrier identifier into the server database.
3. Place carrier 150 onto in-feed logistics system for automatic transport to/from CT scanner and enclosure 300.
4. FOR EACH SCAN,
    (1) Carrier 150 enters room on in-feed conveyors through special lead-lined interlocked double door airlock 210.
    (2) Incoming/outgoing carriers 150 located adjacent to CT couch at optimum height to maximize speed of operation.
    (3) CT scan power is modulated based on meat profile and length.
    (4) Scanned carriers return through interlock into area in loading bay via out-feed conveyor.
5. EMPTY CARRIER
    (1) Remove scanned piece from carrier
    (2) Feed empty carrier to filling station and repeat from step 2 above.

Advantages

It will be appreciated that the process has the following advantages and features.

The jig 100 to ensure accurate break up and length for fitting in the carrier 150 and scanning.

Orientation of the meat for optimum, due to the insert 152 of the carrier 150.

Profile detection system for power modulation. This arises from planning of inlet of parts to the interlock zone, smaller parts being followed by larger parts in an optimum pattern for optimum modulation of power of the scanner 130.

The interlock shutter doors 213 and 214, gentle index conveyors 211/212 and 215/216, scissor lift platform 218, and the passive gripper 250.

Enclosure 300 with food-standard panels with integrated lead lining.

Adjustable height frame with skirts to reduce lead in floor.

Arrangement to re-suspend beef parts for ease of storage and traceability.

Also, the apparatus and process offer the following further advantages.

"Digitization" of carcasses and/or meat pieces so as to facilitate further in-silico composition and morphological analysis to improve decisions/actions at all steps in the meat supply chain.

Animal breeding practices based on meat yield.

Animal husbandry practices (feed, age at slaughter)

Animal payment systems to promote quality, environmental footprint and efficiency.

Automated butchery using digitized images

Optimized sorting where meat composition and morphology is matched to downstream butchery specification (both deboning and retail butchery) to max value.

Target benchmark for downstream processing (e.g. % bone in deboning rooms).

Safe, practical & continuous CT scanning of meat at realistic industry production rates and environmental conditions.

Automated solution to minimize labor input especially environmental risks (radiation) while achieving maximum product yield.

Handling system facilitates the actioning of decisions through linking each meat piece to an animal to a specific operator & transmitting relevant instructions to said operator.

The manner in which the scanner is modified in real time helps to achieve optimum utilization and reliability of the scanner equipment. This real time control is achieved with use of relatively simple and inexpensive items of equipment for the inspection station.

The invention is not limited to the embodiments described but may be varied in construction and detail. For example, while the disclosure describes a tomography scanner (computed tomography, "CT", scanner), it is envisaged that it may alternatively be a scanner of another tomographic type, including for example MRI (Magnetic Resonance Imaging) scanning.

The invention claimed is:

1. A meat processing apparatus comprising an automated analysis stage comprising:
   a radiation-shielded chamber,
   a tomography scanner with a scanner controller, and arranged to perform analysis of meat parts,
   a digital data processor linked with the scanner for processing scan data and providing outputs,
   a port for entry and exit of meat parts placed in carriers into and out of the chamber for analysis by the scanner, and
   a handling system for automated movement of the carriers between the port and the scanner, and a controller for the handling system,
   wherein the scanner comprises a loading conveyor having a bed with a flat planar surface for supporting a carrier while allowing access by a gripper for engaging the carrier.

2. The meat processing apparatus as claimed in claim 1, wherein the port comprises an interlock chamber having an inner door and an outer door and a controller to ensure that while the scanner is operating only one door can open.

3. The meat processing apparatus as claimed in claim 1, wherein the port comprises an interlock chamber having an inner door and an outer door and a controller to ensure that while the scanner is operating only one door can open; and wherein the interlock chamber has an upper conveyor level and a lower conveyor level, one for inlet and one for outlet of carriers before and after analysis.

4. The meat processing apparatus as claimed in claim 1, wherein the handling system comprises a gantry and a robotic gripper arranged to move on the gantry in at least a longitudinal direction between the port and the scanner, and comprising a gripper receiver for receiving and engaging a carrier for a meat part to be analysed; wherein the handling system comprises a plurality of grippers; and wherein the handling system comprises a robotic gripper arranged to move on the gantry in longitudinal and transverse directions with respect to a longitudinal axis of the scanner.

5. The meat processing apparatus as claimed in either of claim 1, wherein the handling system comprises a gantry and a robotic gripper arranged to move on the gantry in at least a longitudinal direction between the port and the scanner, and comprising a gripper receiver for receiving and engaging a carrier for a meat part to be analysed; and wherein the handling system comprises a first gripper for picking a carrier from a first location and placing it onto a scanner table, and a second gripper for picking a carrier from the table and placing it at a second location.

6. The meat processing apparatus as claimed in claim 1, wherein the handling system comprises a gantry and a robotic gripper arranged to move on the gantry in at least a longitudinal direction between the port and the scanner, and comprising a gripper receiver for receiving and engaging a carrier for a meat part to be analysed; and wherein the handling system comprises a first gripper for picking a carrier from a first location and placing it onto a scanner table, and a second gripper for picking a carrier from the table and placing it at a second location; and wherein the handling system is configured to move said first and second grippers along a common axis; and wherein the common axis along which the first gripper and the second gripper are moved is substantially perpendicular to a longitudinal axis for movement of the scanner table into and out of the scanner.

7. The meat processing apparatus as claimed in claim 1, wherein the handling system comprises a gantry and a robotic gripper arranged to move on the gantry in at least a longitudinal direction between the port and the scanner, and comprising a gripper receiver for receiving and engaging a carrier for a meat part to be analysed; and wherein the handling system comprises a first gripper for picking a carrier from a first location and placing it onto a scanner table, and a second gripper for picking a carrier from the table and placing it at a second location; and wherein the handling system is configured to move said first and second grippers along a common axis; and wherein the common axis along which the first gripper and the second gripper are moved is substantially perpendicular to a longitudinal axis for movement of the scanner table into and out of the scanner; and wherein the handling system comprises a third gripper for picking a carrier from a third location and placing it onto the scanner table, and a fourth gripper for picking a carrier from the table and placing it at a fourth location; wherein the third gripper and the fourth gripper are moved synchronously along a further common axis.

8. The meat processing apparatus as claimed in claim 1, wherein the handling system comprises a gantry and a robotic gripper arranged to move on the gantry in at least a longitudinal direction between the port and the scanner, and comprising a gripper receiver for receiving and engaging a carrier for a meat part to be analysed; and wherein the gripper receiver is arranged to receive a carrier moving in the longitudinal direction into a volume within the receiver, and the gripper comprises opposed seats to move laterally inwardly to engage a carrier and to retract to disengage from the carrier, and the opposed seats are L-shaped, with a vertical flange and a substantially horizontal seat configured to engage underneath a lateral edge of the carrier.

9. The meat processing apparatus as claimed in claim 1, wherein the handling system comprises a gantry and a robotic gripper arranged to move on the gantry in at least a longitudinal direction between the port and the scanner; and comprising a gripper receiver for receiving and engaging a carrier for a meat part to be analysed; and wherein the robotic gripper is mounted on a carriage with wheels driven to move on a rail of the gantry.

10. The meat processing apparatus as claimed in claim 1, wherein the handling system comprises a vertically movable platform which is movable between an upper position to receive a carrier from the robotic gripper and a lower position for delivery of the carrier into the port.

11. The meat processing apparatus as claimed in claim 1, wherein at least some of the carriers comprise an open-topped shell and an insert configured to fit without significant relative movement into the shell and to support a meat part at a desired orientation; and wherein the insert comprises sloped internal walls forming a seat for a meat part with a stable orientation.

12. The meat processing apparatus as claimed in claim 1, wherein at least some of the carriers comprise an open-topped shell and an insert configured to fit without significant relative movement into the shell and to support a meat part at a desired orientation; and wherein the insert comprises sloped internal walls forming a seat for a meat part with a stable orientation; and wherein the shell and the insert are each of chemically corrosion resistant and abrasion resistant material with a low XRAY absorptive capacity, and wherein the shell and/or the insert each comprises one or more selected from of PE (Polyethylene), PP (Polypropylene), APET ((Amorphous-polyethylene terephthalate), CPET (Crystalline Polyethylene Terephthalate), PTFE (Polytetrafluoroethylene), PET (polyethylene terephthalate), or HDPE (high-density polyethylene).

13. The meat processing apparatus as claimed in claim 1, wherein the apparatus further comprises a pre-scan inspection station with one or more sensors and arranged to detect volume and/or density of anatomical meat parts on a carrier, and an inspection controller configured to feed corresponding data to the scanner controller; and wherein the scanner controller is configured to modify scanner operation according to said inspection data.

14. The meat processing apparatus as claimed in claim 1, wherein the apparatus further comprises a pre-scan inspection station with one or more sensors and arranged to detect volume and/or density of anatomical meat parts on a carrier, and an inspection controller configured to feed corresponding data to the scanner controller; and wherein the scanner controller is configured to modify scanner operation according to said inspection data; and wherein the scanner controller is configured to change scanner voltage and/or current to compensate for different anatomical meat part depth and/or volume or product artifacts so as to minimize degradation of the scanner; and wherein the sensor comprises a light line scanner, a digital color camera, and an inspection controller configured to generate and transmit commands to the scanner.

15. The meat processing apparatus as claimed in claim 1, wherein the apparatus further comprises a pre-scan inspection station with one or more sensors and arranged to detect volume and/or density of anatomical meat parts on a carrier, and an inspection controller configured to feed corresponding data to the scanner controller; and wherein the scanner controller is configured to modify scanner operation according to said inspection data; and wherein the scanner controller is configured to change scanner voltage and/or current to compensate for different anatomical meat part depth and/or volume or product artifacts so as to minimize degradation of the scanner; and wherein the sensor comprises a light line scanner, a digital color camera, and an inspection controller configured to generate and transmit commands to the scanner; and wherein the inspection controller is configured to record deflection of a structured light line as a carrier flows through the inspection station, and to interpret the line deflection as an indicator of change in meat depth and volume coupled with its linear position relative to a fixed datum on the carrier; and wherein the inspection controller is configured to interpret return of the line to its original shape as an indication of the end point of the meat part, and to record this as a horizontal X position.

16. The meat processing apparatus as claimed in claim 1, wherein the handling system is adapted to sequence introduction of carriers to the scanner on the basis of a preferred scanner power usage scheme; and wherein the handling system is adapted to sequence carriers according to depth, volume and/or density of meat parts to facilitate scanner tube cooling, in which deep meat parts are immediately followed by shorter and shallow meat pieces from the same or different animals.

17. The meat processing apparatus as claimed in any of claim 1, wherein the apparatus further comprises a pre-scan inspection station with one or more sensors and arranged to detect volume and/or density of anatomical meat parts on a carrier, and an inspection controller configured to feed corresponding data to the scanner controller; and wherein the scanner controller is configured to modify scanner operation according to said inspection data; and wherein the inspection controller and the scanner controller are adapted to perform optimization of the scanner on the basis of one or both of:
  intra-carrier control, in which the scanner modulates its power consumption in real time during scanning of the meat parts in a single particular carrier, using more power where there is the greatest density and/or volume in the meat part(s) being scanned, and/or
  inter-carrier control, in which the carriers are fed to the scanner in a sequence in a desired pattern for optimization of the scanner power consumption and other scanner parameters.

18. The meat processing apparatus as claimed in claim 1, wherein the controller is configured to provide feedback data on meat quality determined by scanning, and for routing said feedback data to suppliers; wherein the scanner controller is configured to provide feedforward data to downstream processing stages for optimized boning and/or trimming.

19. A method of operating an apparatus comprising: an automated analysis stage comprising:
  a radiation-shielded chamber,
  a tomography scanner with a scanner controller, and arranged to perform analysis of meat parts,
  a digital data processor linked with the scanner for processing scan data and providing outputs,
  a port for entry and exit of meat parts placed in carriers into and out of the chamber for analysis by the scanner, and
a handling system for automated movement of the carriers between the port and the scanner, and
a controller for the handling system;
wherein the method comprising the steps of:
  placing anatomical meat parts in the carriers,
  controlling the handling system to convey the carriers into and through the port, to the scanner, into the scanner, out of the scanner, back to the port, and out of the port to exit the chamber,
  in which the anatomical meat parts are placed in the carriers in a stable manner, either as a full carcass or one or more parts of a larger carcass,
  wherein the meat parts are inspected automatically by an inspection station and a controller of the inspection station feeds forward data which is used by the scanner controller to control scanner operation according to meat part physical attributes, providing feedback data on meat quality determined by scanning, and routing said feedback data to suppliers, providing feedforward data to downstream processing stages for optimized boning and/or trimming.

20. A meat processing apparatus comprising an automated analysis stage comprising:

a radiation-shielded chamber, a tomography scanner with a scanner controller, and arranged to perform analysis of meat parts, a digital data processor linked with the scanner for processing scan data and providing outputs, a port for entry and exit of meat parts placed in carriers into and out of the chamber for analysis by the scanner, and a handling system for automated movement of the carriers between the port and the scanner, and a controller for the handling system, wherein the controller is configured to provide feedback data on meat quality determined by scanning, and for routing said feedback data to suppliers; wherein the scanner controller is configured to provide feedforward data to downstream processing stages for optimized boning and/or trimming.

21. A meat processing apparatus comprising an automated analysis stage comprising:

a radiation-shielded chamber, a tomography scanner with a scanner controller, and arranged to perform analysis of meat parts, a digital data processor linked with the scanner for processing scan data and providing outputs, a port for entry and exit of meat parts placed in carriers into and out of the chamber for analysis by the scanner, and a handling system for automated movement of the carriers between the port and the scanner, and a controller for the handling system, the handling system comprising a vertically movable platform which is movable between an upper position to receive a carrier from the robotic gripper and a lower position for delivery of the carrier into the port.

* * * * *